United States Patent
Yokotani et al.

(10) Patent No.: US 12,049,033 B2
(45) Date of Patent: Jul. 30, 2024

(54) INJECTION MOLDING MACHINE, INJECTION MOLDING SYSTEM, AND METHOD OF MANUFACTURING RESIN MOLDED PRODUCT

(71) Applicant: CANON KABUSHIKI KAISHA, Tokyo (JP)

(72) Inventors: Kyosuke Yokotani, Kanagawa (JP); Takamichi Ochiai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 259 days.

(21) Appl. No.: 17/752,619

(22) Filed: May 24, 2022

(65) Prior Publication Data

US 2022/0388212 A1 Dec. 8, 2022

(30) Foreign Application Priority Data

May 28, 2021 (JP) .................. 2021-090315

(51) Int. Cl.
  *B29C 45/22* (2006.01)
  *B29C 45/28* (2006.01)
  *B29C 45/27* (2006.01)

(52) U.S. Cl.
  CPC .......... *B29C 45/22* (2013.01); *B29C 45/2806* (2013.01); *B29C 2045/2796* (2013.01)

(58) Field of Classification Search
  CPC ..... B29C 45/07; B29C 45/22; B29C 45/2806; B29C 2045/073; B29C 2045/202; B29C 2045/2796
  See application file for complete search history.

(56) References Cited

FOREIGN PATENT DOCUMENTS

| JP | H0516188 A | 1/1993 |
|----|------------|--------|
| JP | H07178773 A | 7/1995 |
| JP | 2812897 B2 | 10/1998 |
| JP | 3079268 U | 5/2001 |
| JP | 2001-334551 A | 12/2001 |
| JP | 3609808 B2 | 1/2005 |
| JP | 2005-219281 A | 8/2005 |
| JP | 2009-262215 A | 11/2009 |

*Primary Examiner* — James Sanders
(74) *Attorney, Agent, or Firm* — Canon U.S.A., Inc., IP Division

(57) ABSTRACT

In an injection molding machine including a first nozzle and a second nozzle that injects resin into a mold from the first nozzle through the second nozzle, a distance between the second nozzle and the mold is changed with movement of at least the second nozzle in a first direction, and the second nozzle is displaceable in a second direction in a state in which the mold is fixedly secured relative to the first nozzle and the second nozzle is in contact with the first nozzle.

21 Claims, 13 Drawing Sheets

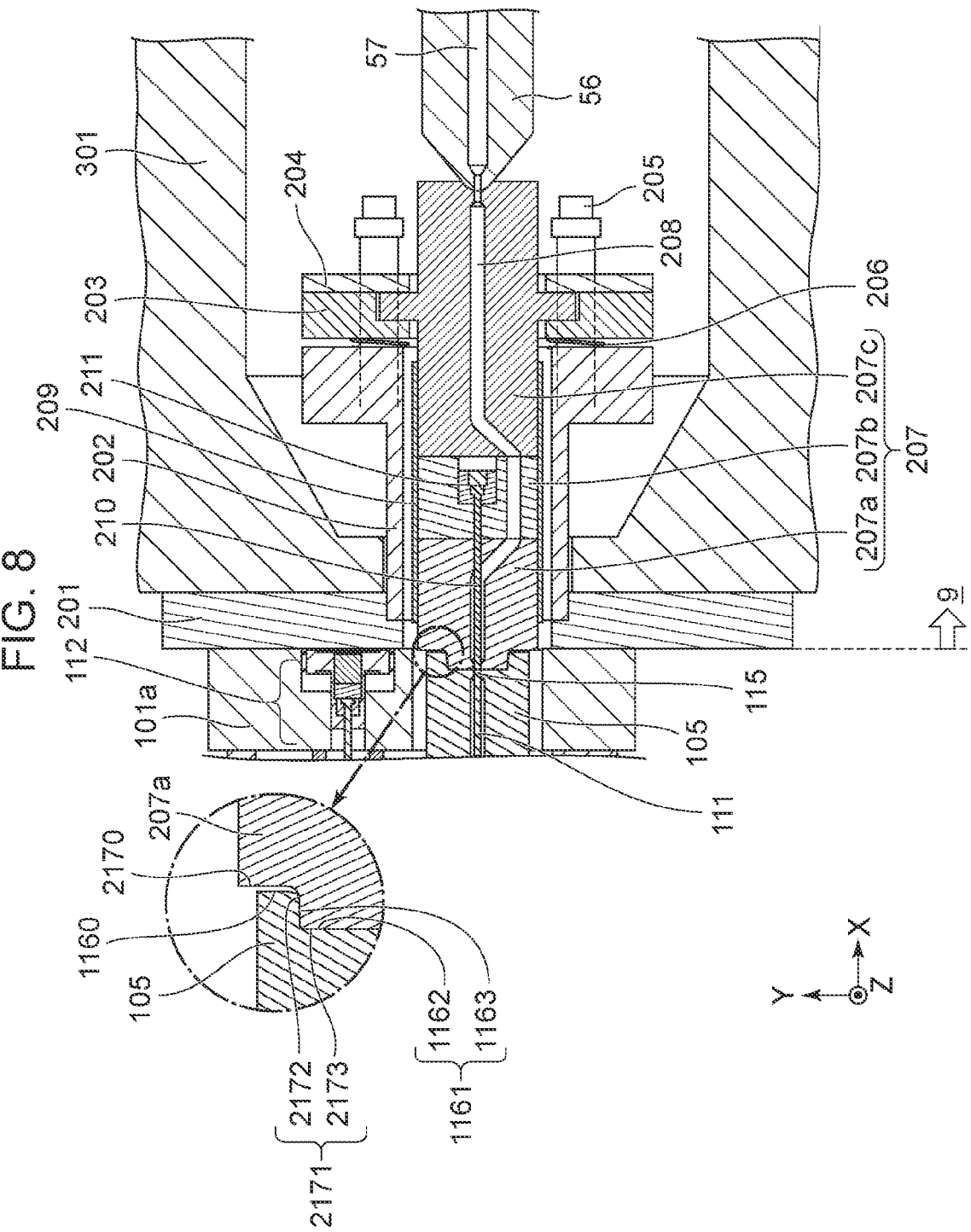

INJECTION MOLDING MACHINE, INJECTION MOLDING SYSTEM, AND METHOD OF MANUFACTURING RESIN MOLDED PRODUCT

BACKGROUND

Field

The present disclosure relates to injection molding.

Description of the Related Art

There is known a technique of performing injection molding with multiple nozzles. Japanese Patent Laid-Open No. 7-178773 discloses a stringiness prevention apparatus for an injection mold using a hot runner that includes a hot runner block, a hot runner nozzle, a sprue disposed in the injection mold, and a transverse plate member. The hot runner block is arranged to face a nozzle of an injection molding machine, and the hot runner nozzle is arranged in the hot runner block. The sprue is arranged to face the hot runner nozzle, and the transverse plate member is arranged to lie in a direction intersecting an axis of a molten resin flow path at an upper end of the sprue.

How to lay out the hot runner nozzle is not sufficiently studied in the technique disclosed in Japanese Patent Laid-Open No. 7-178773, and satisfactory injection molding cannot be performed with the disclosed technique in some cases.

SUMMARY

According to a first aspect of the present disclosure, an injection molding machine includes a first nozzle and a second nozzle and is configured to inject resin into a mold from the first nozzle through the second nozzle, wherein a distance between the second nozzle and the mold is changed with movement of at least the second nozzle in a first direction, and the second nozzle is displaceable in a second direction intersecting the first direction in a state in which the mold is fixedly secured relative to the first nozzle and the second nozzle is in contact with the first nozzle.

According to a second aspect of the present disclosure, a method of manufacturing a resin molded product by injecting resin into a mold from a first nozzle through a second nozzle includes changing a distance between the second nozzle and the mold by moving at least the second nozzle in a first direction, and displacing the second nozzle in a second direction intersecting the first direction in a state in which the mold is fixedly secured relative to the first nozzle and the second nozzle is in contact with the first nozzle.

Further features will become apparent from the following description of exemplary embodiments with reference to the attached drawings.

BRIEF DESCRIPTION OF THE DRAWINGS

FIG. 8 is a schematic view illustrating the operation of the injection molding machine.

DESCRIPTION OF THE EMBODIMENTS

An exemplary embodiment of the present disclosure will be described below with reference to the drawings. In the following description and the drawings, components common to the drawings are denoted by common reference numbers.

Common components are described with reference to the several drawings together, and description about the components denoted by the common reference numbers are omitted as appropriate in some cases. Different items referenced by the same name are made distinguishable by adding, for example, "first" and "second" to the items, such as "first item (name)" and "second item (name)".

An outline of an injection molding machine 9 according to the exemplary embodiment is described with reference to FIGS. 1A and 1B. An orthogonal coordinate system illustrated in FIGS. 1A and 1B, for example, an X-axis direction and a Y-axis direction are each a horizontal direction, and a Z-axis direction is a vertical direction (plumb direction). As an alternative, the X-axis direction and the Y-axis direction can each be set to the vertical direction (plumb direction).

Figure 1A:
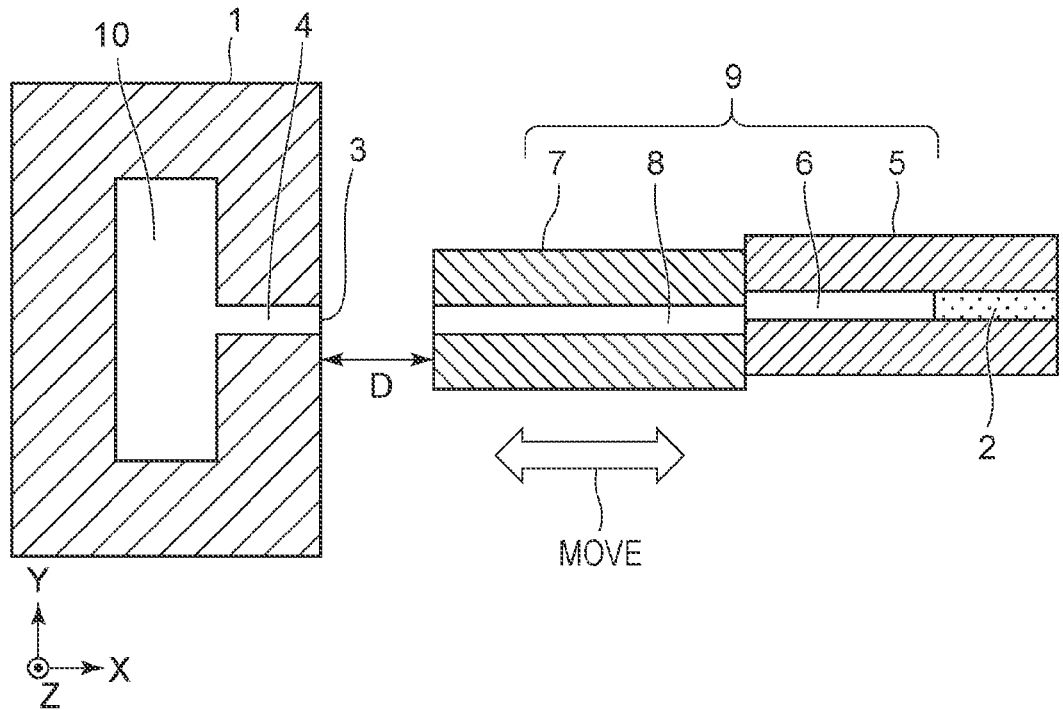
FIGS. 1A and 1B are schematic views illustrating an injection molding machine.
Figure 1B:
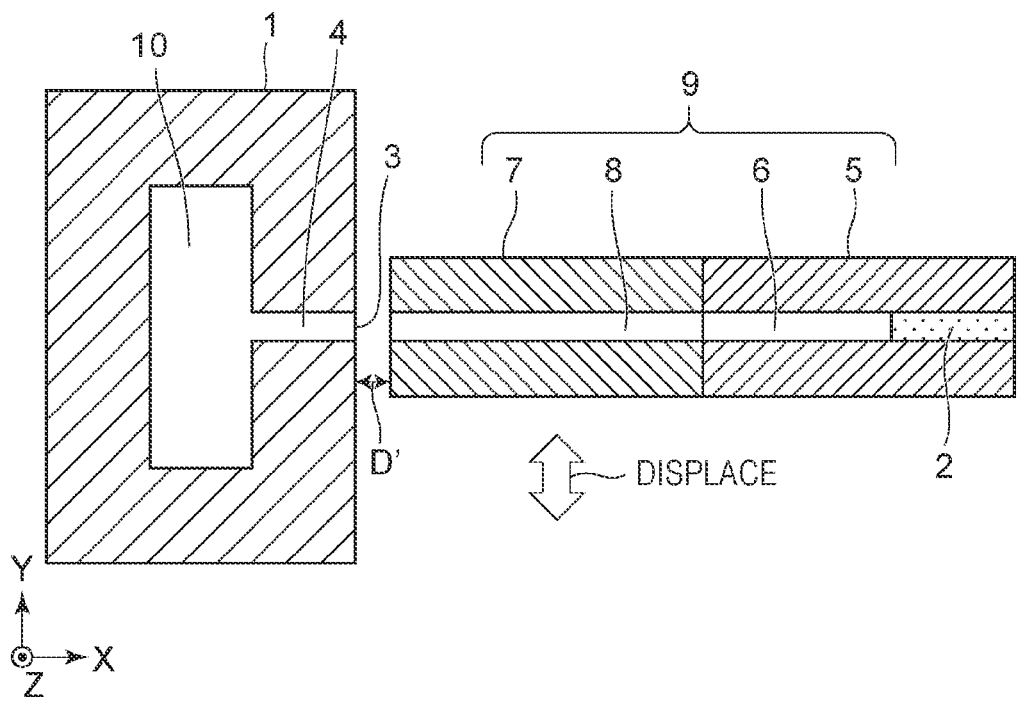

FIGS. 1A and 1B illustrate a scenario where the injection molding machine 9 injects resin 2 into a mold 1. The injection molding machine 9 includes a nozzle 5 and a nozzle 7. Resin 2 is injected into the mold 1 from the nozzle 5 through the nozzle 7. The nozzle 5 includes a resin flow path 6 through which the resin 2 flows, and the nozzle 7 includes a resin flow path 8 through which the resin 2 flows. The mold 1 includes an injection hole 3, a runner 4, and a cavity 10. The resin 2 is injected into the cavity 10 from the injection hole 3 of the mold 1 through the runner 4. The shape of the cavity 10 defines a shape of at least part of a resin molded product that is to be manufactured by the injection molding machine 9.

A distance between the nozzle 7 and the mold 1 is changed with at least the nozzle 7 moving in the X-axis direction. FIG. 1A represents a state in which the distance between the nozzle 7 and the mold 1 is D, while FIG. 1B represents a state after the distance between the nozzle 7 and the mold 1 is changed to D' from the state of FIG. 1A. The distance D' is shorter than the distance D. Thus, FIGS. 1A and 1B illustrate the case in which the distance between the nozzle 7 and the mold 1 is reduced.

The distance between the nozzle 7 and the mold 1 can be increased by moving at least the nozzle 7 in the X-axis direction. When the distance between the nozzle 7 and the mold 1 is changed, the nozzle 5 can also be moved in the X-axis direction, or the nozzle 5 need not be moved in the X-axis direction. For example, after moving just the nozzle 7 in the X-axis direction, the nozzle 5 can then be moved in the X-axis direction. In the state illustrated in FIG. 1A, the nozzle 7 is in contact with the nozzle 5, and the nozzle 5 is moved in the X-axis direction in conjunction with moving the nozzle 7. In another exemplary embodiment, the nozzle 7 can be positioned apart from the nozzle 5 in the state of FIG. 1A.

In the state of FIG. 1B, the mold 1 is fixedly secured relative to the nozzle 5. The nozzle 7 is in contact with the nozzle 5. In this state of FIG. 1B, the nozzle 7 is displaceable in the Y-axis direction intersecting the X-axis direction. The Y-axis direction is orthogonal to the X-axis direction here, but in another exemplary embodiment, the Y-axis direction can be inclined relative to the X-axis direction. While FIG. 1B illustrates an example in which the mold 1 and the nozzle 7 are positioned apart from each other by the distance D', in another exemplary embodiment, the nozzle 7 can be displaceable in the Y-axis direction in the state in which the nozzle 7 is in contact with the mold 1.

Because the nozzle 7 is displaceable in the Y-axis direction as described above, accurate positioning between the nozzle 7 and the mold 1 (e.g., the injection hole 3) can be realized. Therefore, the resin 2 can be suppressed from leaking from between the nozzle 7 and the mold 1. Thus, it is possible to effectively use the resin 2 and to reduce a possibility that the injection molding machine 9 can be soiled with the leaked resin 2. In addition, because the nozzle 7 is displaceable in the Y-axis direction, damage(s) of the nozzle 7 can be suppressed. Thus, the present embodiment can provide a technique that is advantageous in performing the injection molding in a satisfactory fashion.

In a method of manufacturing a resin molded product by injecting the resin 2 into the mold 1 from the nozzle 5 through the nozzle 7, the nozzle 7 is not always required to be arranged on the injection molding machine 9. In another exemplary embodiment, the nozzle 7 can be arranged on an intermediate mold that is joined to the mold 1 including the cavity 10.

In a resin molded product manufacturing method according to the present embodiment, at least the nozzle 7 is moved in the X-axis direction, thereby changing the distance between the nozzle 7 and the mold 1. The nozzle 7 is displaced in the Y-axis direction intersecting the X-axis direction in the state in which the mold 1 is fixedly secured relative to the nozzle 5 and in which the nozzle 5 is in contact with the nozzle 7. Therefore, the resin 2 can be suppressed from leaking from between the nozzle 7 and the mold 1, and voids, etc. can be suppressed from generating in a resin molded product. In addition, because damage(s) of the nozzle 7 can be suppressed as described above, production efficiency can be increased. Consequently, the present embodiment can provide a technique that is advantageous in performing the injection molding in a satisfactory fashion.

The injection molding machine 9 and the resin molded product manufacturing method will be described in more detail below with reference to FIGS. 2 to 14.

Figure 2:
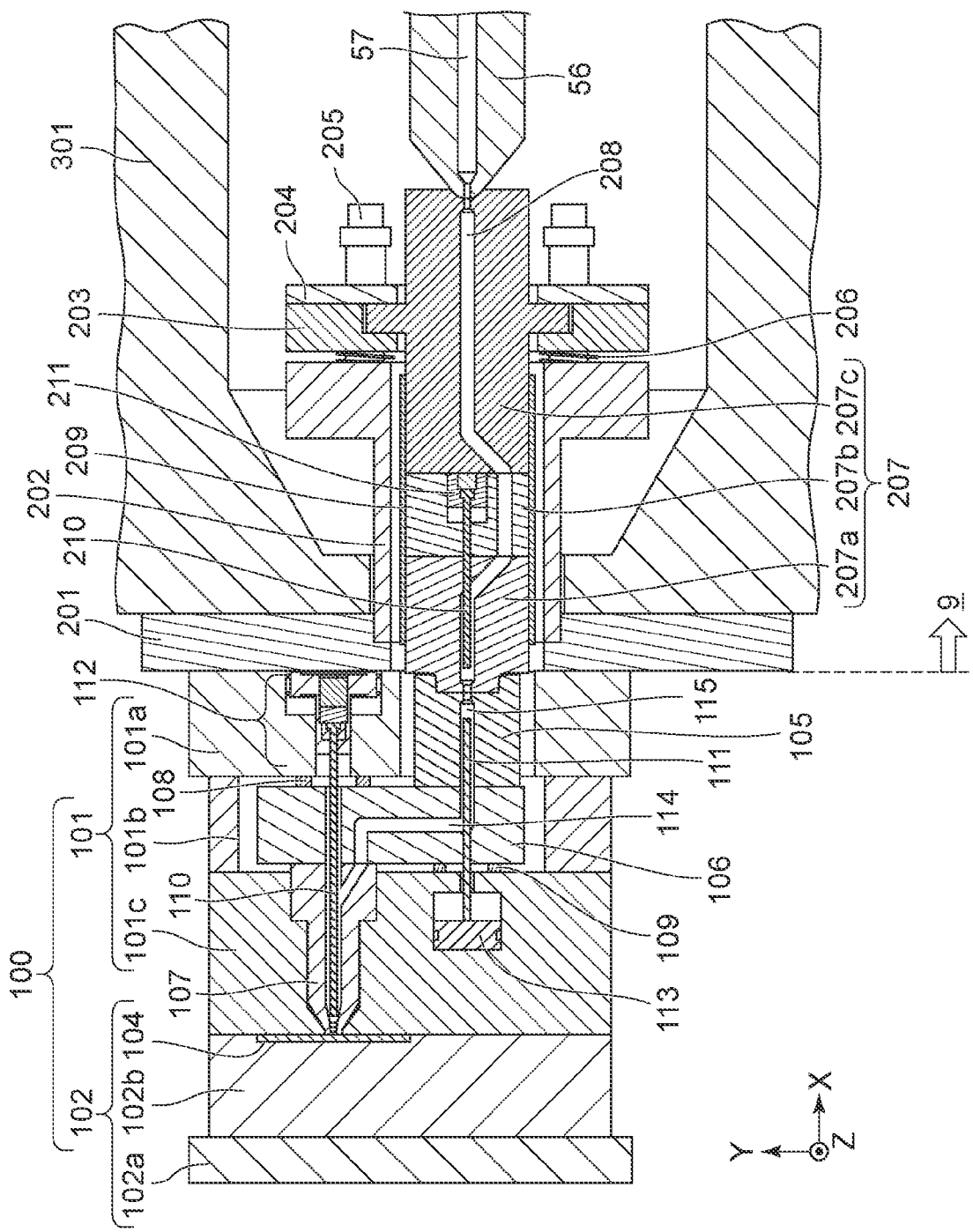
FIG. 2 is a schematic view illustrating the injection molding machine.

FIG. 2 is a schematic view illustrating a structure of principal part of the injection molding machine 9 and a structure of a mold 100 according to the present embodiment. The relationship between the description with respect to FIG. 2 and the description with respect to FIG. 1 is as follows. A mold 100 is an example of the mold 1, a sprue 115 is an example of the injection hole 3, a hot runner 114 is an example of the runner 4, and a cavity 104 is an example of the cavity 10. An injection nozzle 56 is an example of the nozzle 5, a resin flow path 57 is an example of the resin flow path 6, a hot runner nozzle 207 is an example of is the nozzle 7, and a hot runner 208 is an example of the resin flow path 8.

Figure 3A:
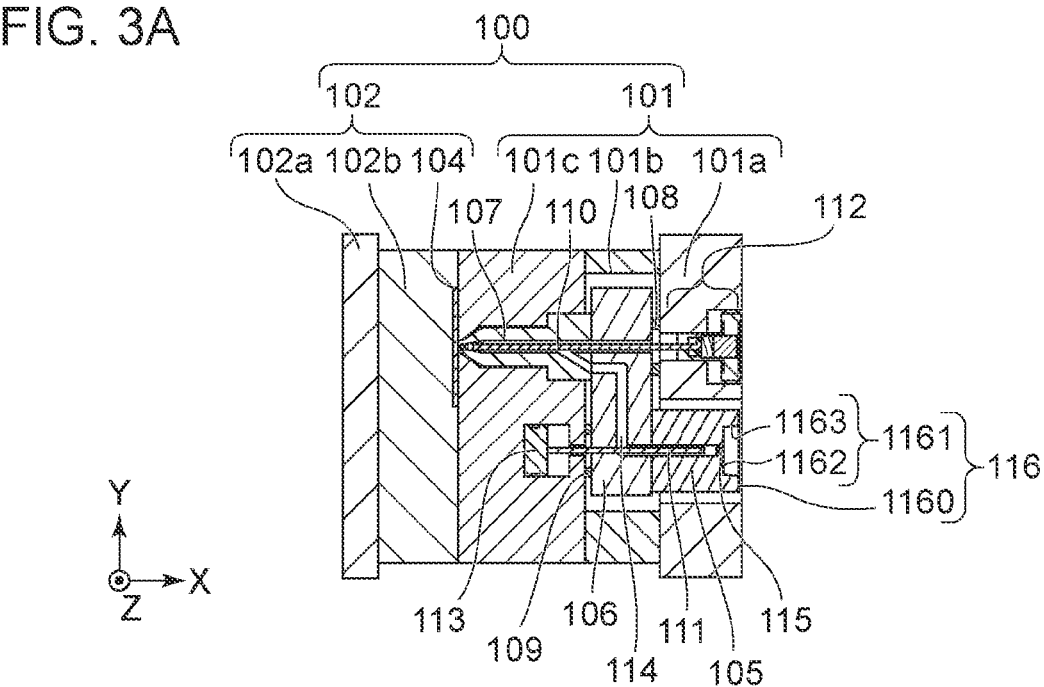
FIGS. 3A and 3B are schematic views illustrating the injection molding machine.

The structure of the mold 100 is described with reference to FIG. 3A. The mold 100 comprises a fixed mold 101 and a movable mold 102 that is opened and closed with respect to the fixed mold 101. The mold 100 includes an attachment plate 101a for the fixed mold 101, an attachment plate 102a for the movable mold 102, a mold plate 101b for the fixed mold 101, and a mold plate 101c for the fixed mold 101. The mold 100 includes a mold plate 102b for the movable mold 102. The fixed mold 101 of the mold 100 comprises the attachment plate 101a, the mold plate 101b, and the mold plate 101c. The movable mold 102 of the mold 100 comprises the attachment plate 102a and the mold plate 102b. The mold 100 further includes the sprue 115, the hot runner 114, and the cavity 104 through and into which molten resin flows. The sprue 115 is a resin injection hole in the mold 100.

The mold 100 with the hot runner 114 includes a structure (e.g., hot runner structure) in which a heating mechanism (e.g., heater) for heating the resin in the hot runner 114 is arranged around the runner (e.g., the hot runner 114) that is the resin flow path in the mold 100.

To realize the hot runner structure, the mold 100 includes a sprue bushing 105, a manifold 106, a body 107, ring-shaped holders 108 and 109 for securing the manifold 106 onto the mold 100, valve pins 110 and 111, and cylinders 112 and 113. The sprue 115 and the hot runner 114 form a resin flow path between the hot runner nozzle 207 and the cavity 104 in the present embodiment. The valve pin 110 enables opening and closing the resin flow path (e.g., the hot runner 114) in the mold 100. The valve pin 110 seals the resin injection hole through which the resin flows into the cavity 104 through the hot runner 114. The mold 100 also includes a valve pin 111 for sealing an injection hole (e.g., the sprue 115) that enables the resin to flow to the hot runner 114 from the hot runner nozzle 207. The cylinder 112 drives the valve pin 110, while the cylinder 113 drives the valve pin 111.

The mold 100 (e.g., the sprue bushing 105) includes a nozzle touch portion 116 in the vicinity of the sprue 115. The nozzle touch portion 116 of the sprue bushing 105 includes a recess 1161 that is recessed from a reference surface 1160 of the nozzle touch portion 116. A side surface 1163 of the recess 1161 is a surface inclined relative to the X-axis direction. The nozzle touch portion 116 of the sprue bushing 105 thus includes the side surface 1163 that is the inclined surface inclined relative to the X-axis direction. A bottom surface 1162 of the recess 1161 is a flat surface along the Y-axis direction. Thus, the nozzle touch portion 116 of the sprue bushing 105 includes the bottom surface 1162 that is the flat surface along the Y-axis direction. The bottom surface 1162 defines the injection hole (e.g., the sprue 115) through which the resin flows into the hot runner 114.

Figure 3B:
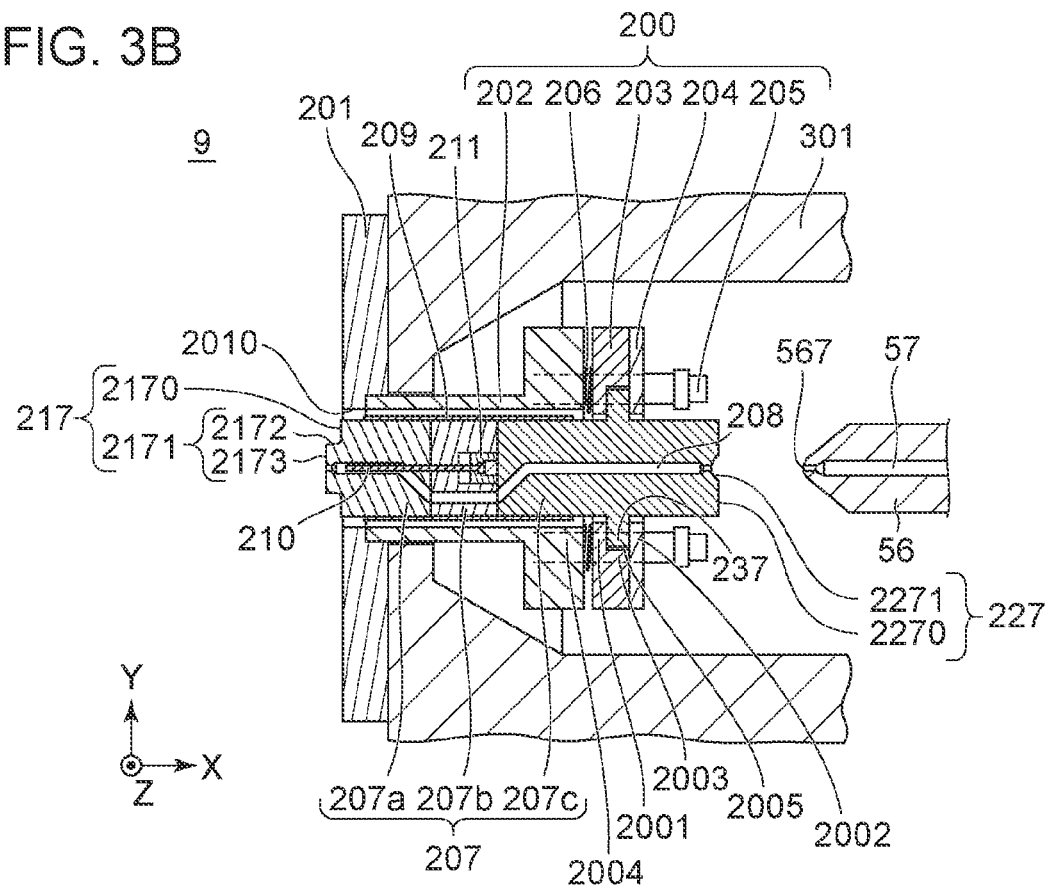

FIG. 3B illustrates the structure of the injection molding machine 9 in the vicinity of the hot runner nozzle 207 according to the present embodiment. In FIG. 3B, the injection nozzle 56 is illustrated at a position apart from the hot runner nozzle 207. The hot runner nozzle 207 comprises a nozzle component 207a, a nozzle component 207b, and a nozzle component 207c. A leading-edge portion 217 forming an end portion of the hot runner nozzle 207 on a side closer to the mold 100 comprises a nozzle component 207a. A trailing-edge portion 227 forming an end portion of the hot runner nozzle 207 on a side closer to the injection nozzle 56 comprises the nozzle component 207c. The nozzle component 207b is arranged between the nozzle component 207a and the nozzle component 207c. As illustrated in FIG. 3B, the hot runner nozzle 207 includes a protruding portion 237 that protrudes in the Y-axis direction.

The hot runner nozzle 207 is secured by a positioning plate 201, a fixed flange 202, a floating plate 203, a pressure plate 204, a guide pin 205, and a spring component 206. The fixed flange 202, the floating plate 203, the pressure plate 204, the guide pin 205, and the spring component 206 are coupled to each other to form a holder 200 that secures the hot runner nozzle 207.

As illustrated in FIG. 3B, the holder 200 includes sandwiching portions 2001 and 2002 that are arranged side by side in the X-axis direction. The protruding portion 237 is positioned between the sandwiching portions 2001 and 2002 in the X-axis direction. The protruding portion 237 secured between the sandwiching portions 2001 and 2002 can be positioned apart from at least one of the sandwiching portions 2001 and 2002. When the hot runner nozzle 207 is displaced in the Y-axis direction, the protruding portion 237 is moved between the sandwiching portions 2001 and 2002 in the Y-axis direction.

The holder 200 includes a facing portion 2003 positioned to face the protruding portion 237 in the Y-axis direction with a gap 2005 interposed therebetween. When the hot runner nozzle 207 is displaced in the Y-axis direction, a size of the gap 2005 between the protruding portion 237 and the facing portion 2003 is changed. In other words, frictional force between the protruding portion 237 and the holder 200 in the Y-axis direction is adjusted (the frictional force can be set to zero) and the gap 2005 is formed to define a clearance in the Y-axis direction such that the hot runner nozzle 207 is displaceable in the Y-axis direction.

In the illustrated example, the floating plate 203 serving as a component of the holder 200 includes the sandwiching portion 2001 and the facing portion 2003. The pressure plate 204 serving as a component of the holder 200 but being separate from the floating plate 203 includes the sandwiching portion 2002. The holder 200 also includes a fixed portion 2004 and the spring component 206, the fixed portion 2004 being fixedly secured relative to the injection nozzle 56 with the aid of both a fixed-side platen 301 and the positioning plate 201.

In the illustrated example, the fixed flange 202 serving as a component of the holder 200 includes the fixed portion 2004. The sandwiching portion 2001 is joined to the fixed portion 2004 (i.e., the fixed flange 202) with the spring component 206 interposed therebetween. The holder 200 also includes the guide pin 205 that is fitted to the fixed portion 2004 (i.e., the fixed flange 202) after penetrating through the pressure plate 204, the floating plate 203, and the spring component 206.

The guide pin 205 is a fixing component for fixedly securing the fixed flange 202, the positioning plate 201, the spring component 206, the floating plate 203, and the pressure plate 204 in the Y-axis direction. With deformation of the spring component 206, the floating plate 203 and the pressure plate 204 are displaceable relative to the fixed flange 202 in the X-axis direction.

The injection molding machine 9 includes the fixed-side platen 301 as a fixed member for fixedly securing the injection nozzle 56. The holder 200 (i.e., the fixed flange 202) is fitted and fixed to the fixed-side platen 301.

The injection molding machine 9 includes the positioning plate 201 as an abutment member that is secured in abutment on the mold 100. The positioning plate 201 is fixed to the fixed-side platen 301 of the injection molding machine 9.

The fixed flange 202 is fitted to the positioning plate 201. An opening 2010 is formed in the positioning plate 201. The hot runner nozzle 207 is movable through the opening 2010 in the X-axis direction. The floating plate 203 and the pressure plate 204 sandwich the protruding portion 237 that protrudes from a side surface portion of the hot runner nozzle 207.

The guide pin 205 guides movement of the floating plate 203 and the pressure plate 204 in a direction in which the hot runner nozzle 207 is moved forward and backward (i.e., in the X-axis direction). The guide pin 205 restricts displacement of the floating plate 203 and the pressure plate 204 in the Y-axis direction.

The spring component 206 prevents the hot runner nozzle 207 and the injection nozzle 56 from moving apart from each other when the injection nozzle 56 is moved backward. The hot runner 208 is a resin flow path between the hot runner 114 (e.g. the sprue 115) of the mold 100 and the injection nozzle 56. The heater 209 heats the resin in the resin flow path (i.e., the hot runner 208) in the hot runner nozzle 207.

To keep the resin within the hot runner 208 in a molten state, temperature of the hot runner nozzle 207 is controlled by the heater 209. The hot runner nozzle 207 includes a valve pin 210 for opening and closing the resin flow path (i.e., the hot runner 208) in the hot runner nozzle 207. The valve pin 210 opens and closes the resin flow path in the leading-edge portion 217 (i.e., the nozzle component 207a) of the hot runner nozzle 207.

The valve pin 210 seals a resin inlet hole through which the resin flows into the hot runner 114 (e.g., the sprue 115) of the mold 100. The cylinder 211 drives the valve pin 210. While the injection nozzle 56 in the illustrated example does not include a valve pin for opening and closing the resin flow path 57 in the injection nozzle 56, in another exemplary embodiment the injection nozzle 56 can include a valve pin for opening and closing the resin flow path 57 in the injection nozzle 56.

The leading-edge portion 217 (i.e., the nozzle component 207a) of the hot runner nozzle 207 includes a protrusion 2171 protruding from a reference surface 2170 of the leading-edge portion 217. A side surface 2172 of the protrusion 2171 is a surface inclined relative to the X-axis direction. Thus, the leading-edge portion 217 of the hot runner nozzle 207 includes the side surface 2172 that is the inclined surface inclined relative to the X-direction. An edge surface 2173 of the protrusion 2171 is a flat surface along the Y-axis direction. Thus, the leading-edge portion 217 of the hot runner nozzle 207 includes the edge surface 2173 that is the flat surface along the Y-direction. An exit of the hot runner 208 (i.e., the resin flow path) is defined in the edge surface 2173.

The trailing-edge portion 227 (i.e., the nozzle component 207c) of the hot runner nozzle 207 includes a recess 2271 that is recessed from a reference surface 2270 of the trailing-edge portion 227. As illustrated in FIG. 2, the recess 2271 in the trailing-edge portion 227 of the hot runner nozzle 207 contacts a leading-edge portion 567 of the injection nozzle 56. The recess 2271 has a curved surface in a substantially spherical shape and does not have a bottom surface and a side surface that are distinguishable from each other like the bottom surface 1162 and the side surface 1163 of the recess 1161. The leading-edge portion 567 of the injection nozzle 56 is formed by a curved surface in a substantially spherical shape and a conical surface extending from the curved surface in an oblique direction.

The curved surface of the recess 2271 in the trailing-edge portion 227 of the hot runner nozzle 207 has substantially the same shape as that of the leading-edge portion 567 of the injection nozzle 56. This enables the leading-edge portion 567 of the injection nozzle 56 to be fitted into the recess 2271 in the trailing-edge portion 227 of the hot runner nozzle 207. When the injection nozzle 56 does not include a valve pin for opening and closing the resin flow path 57, leakage of the resin from the injection nozzle 56 is suppressed with the trailing-edge portion 227 of the hot runner nozzle 207 contacting the leading-edge portion 567 of the injection nozzle 56.

An example of a nozzle touch operation of the hot runner nozzle 207 of the present embodiment will be described below with reference to states illustrated in FIGS. 4 to 8.

Figure 4:
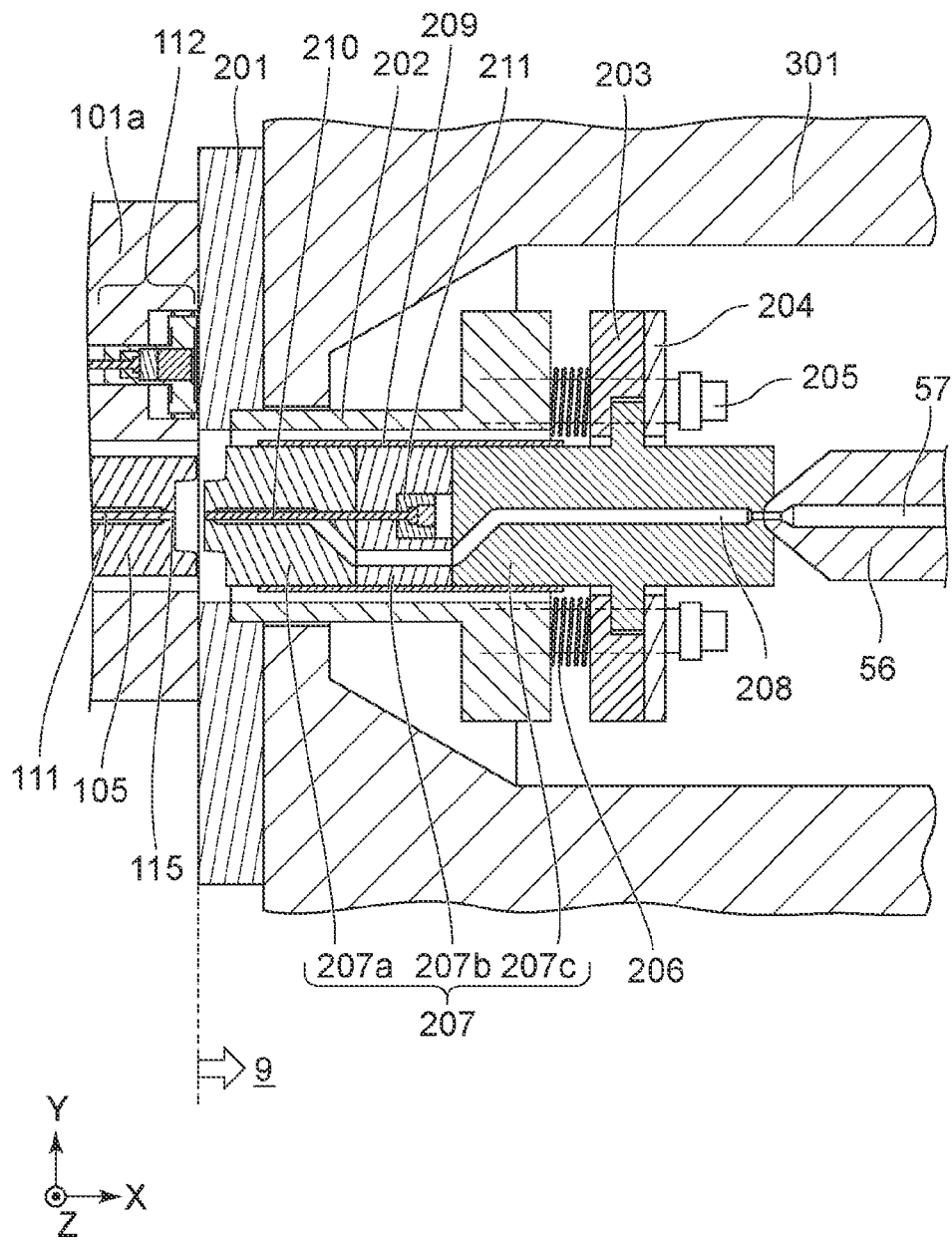
FIG. 4 is a schematic view illustrating an operation of the injection molding machine.

FIG. 4 illustrates a state of the hot runner nozzle 207 when the injection nozzle 56 is moved backward.

The hot runner nozzle 207 is positioned apart from the sprue bushing 105. When the injection nozzle 56 is operated to move backward, the floating plate 203, the pressure plate 204, and the hot runner nozzle 207 are also moved backward. At that time, the trailing-edge portion 227 of the hot runner nozzle 207, where the hot runner nozzle 207 is sandwiched between the floating plate 203 and the pressure plate 204, is pressed against the injection nozzle 56 by a pressing force of the spring component 206. Accordingly, the hot runner nozzle 207 and the injection nozzle 56 are moved backward while they are kept in contact with each other. On that occasion, the valve pin 111 in the mold 100 and the valve pin 210 in the hot runner nozzle 207 are each in a state sealing the resin inlet hole such that leakage of the resin through the resin inlet hole through which the resin flows from the hot runner nozzle 207 to the hot runner 114 of the mold does not occur.

Figure 5:
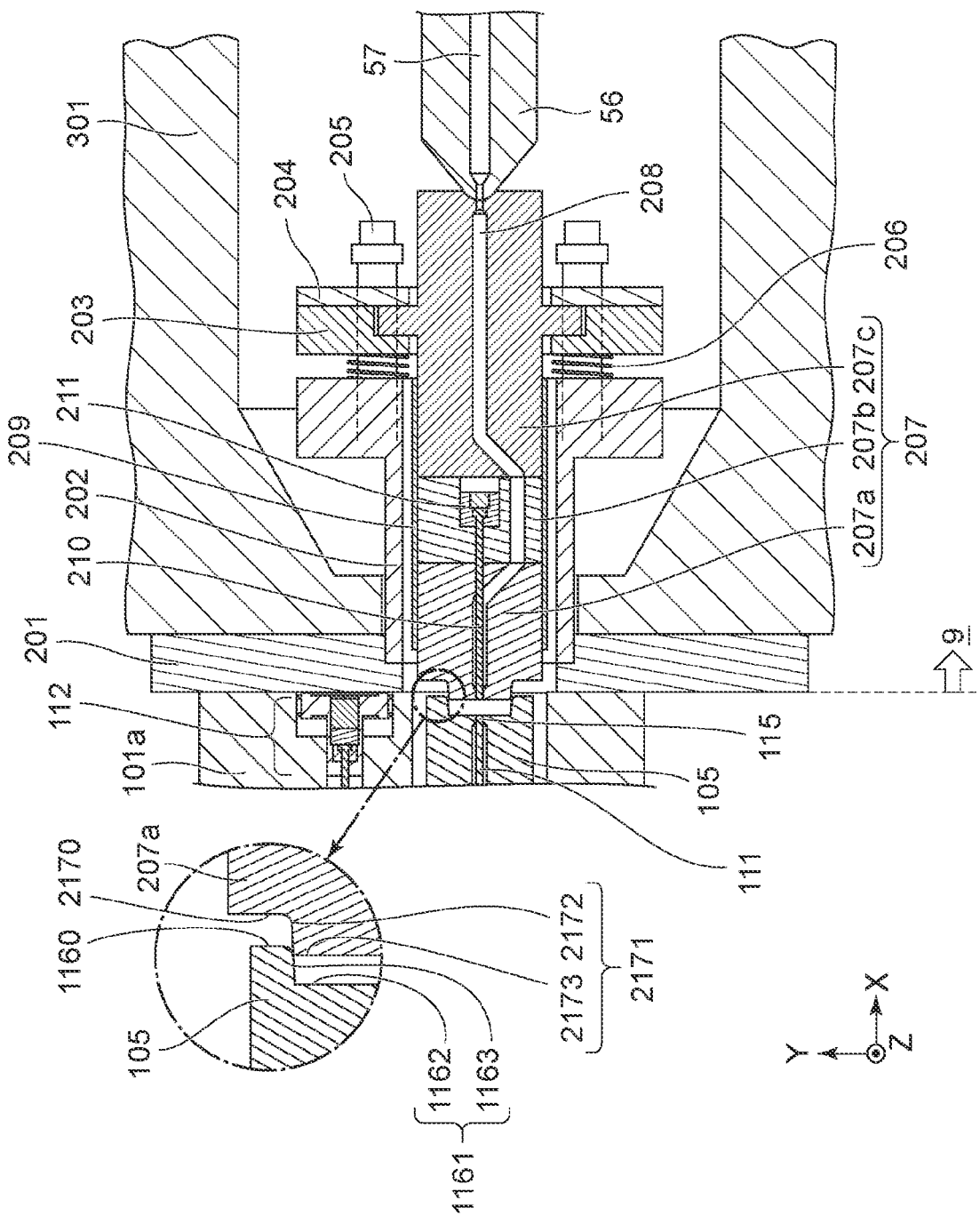
FIG. 5 is a schematic view illustrating the operation of the injection molding machine.

FIG. 5 illustrates a state of the hot runner nozzle 207 when the injection nozzle 56 is moved forward.

The hot runner nozzle 207 starts to contact the sprue bushing 105 of the mold 100. At that time, since the sprue bushing 105 and the nozzle component 207a of the hot runner nozzle 207 have the shapes including the inclined surfaces, the hot runner nozzle 207 is moved forward while contacting the side surface 1163 of the sprue bushing 105 with the forward movement of the injection nozzle 56.

The leading-edge portion of the hot runner nozzle 207 on the side closer to the mold 100 starts to fit into the recess 1161 formed in the mold 100.

Figure 6:
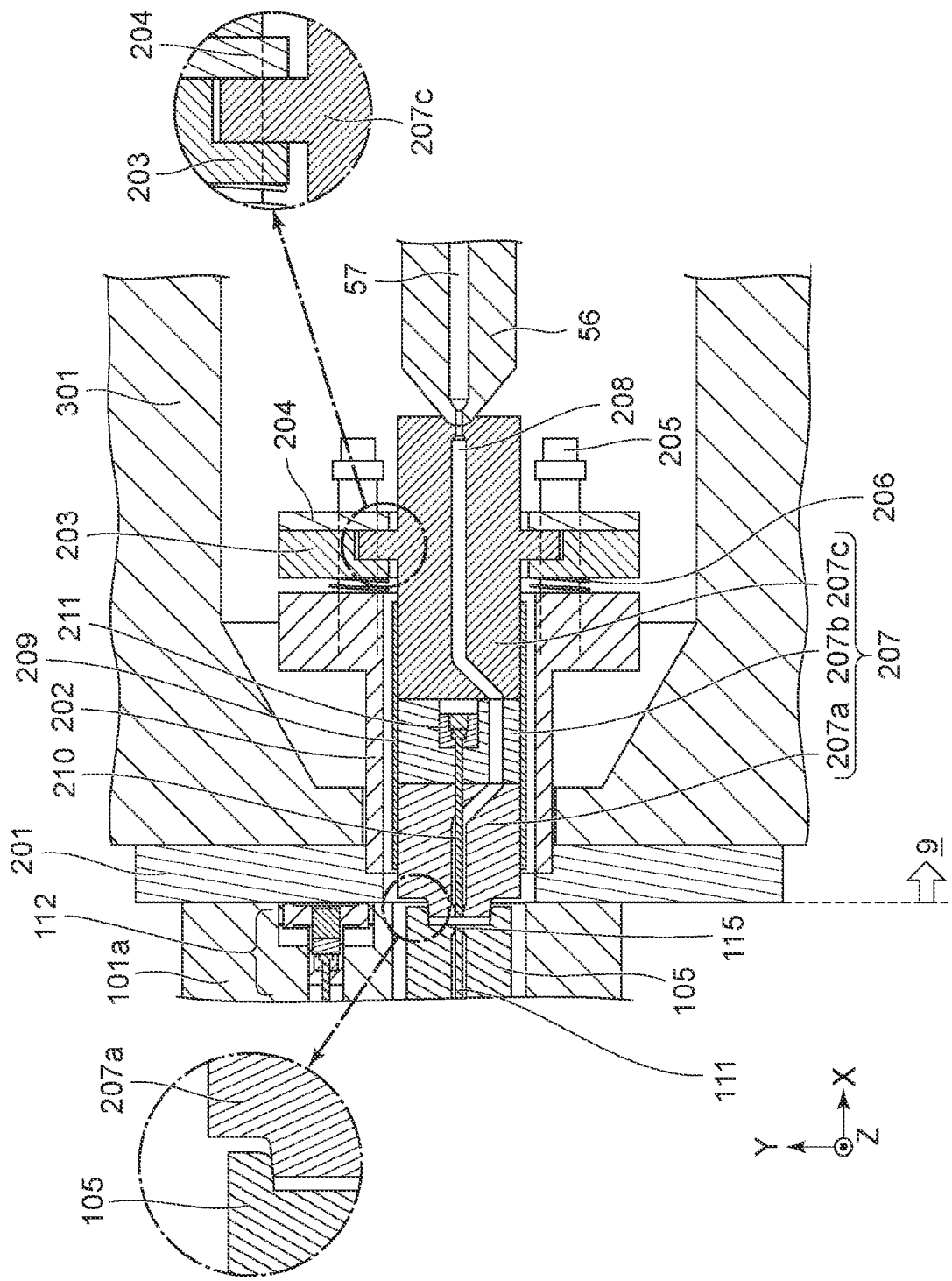
FIG. 6 is a schematic view illustrating the operation of the injection molding machine.
Figure 7:
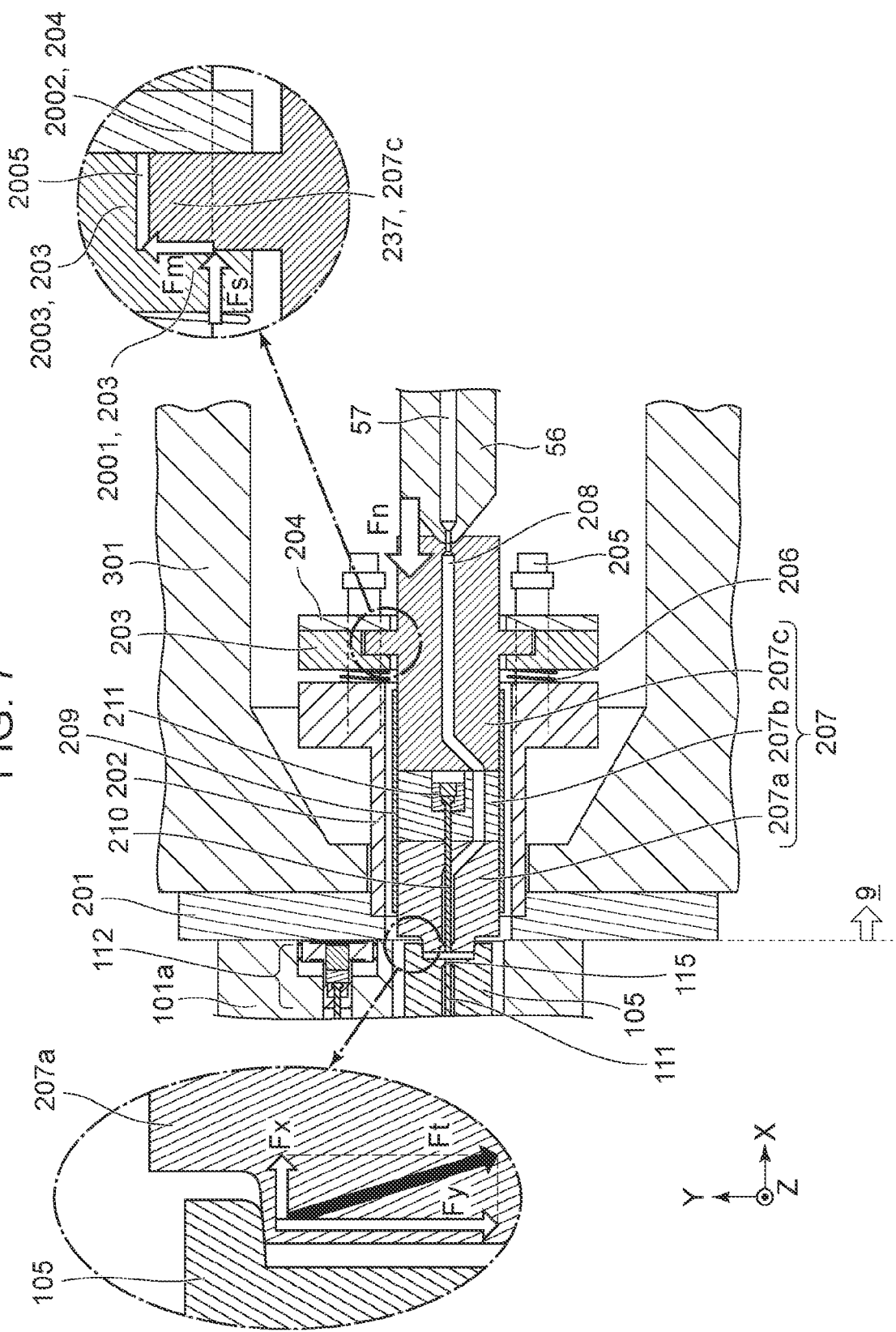
FIG. 7 is a schematic view illustrating the operation of the injection molding machine.

FIG. 6 illustrates a state (floating operation) in which the hot runner nozzle 207 is moved in a direction (Y-axis direction) perpendicular to an axial direction (X-axis direction) of the injection nozzle 56. FIG. 7 illustrates relationships among forces generated during the floating operation.

Forward force Fn of the injection nozzle 56, compressive force Fs of the spring component 206 caused by the forward force Fn, and frictional force Fm generated in the vertical direction in response to the compressive force Fs of the spring component 206 act on the hot runner nozzle 207 (e.g., the nozzle component 207c). When the center positions of the sprue bushing 105 and the injection nozzle 56 are out of alignment, contact reaction force Ft with respect to the sprue bushing 105 acts on the inclined surface (e.g., the side surface 2172) of the leading-edge portion 217 of the hot runner nozzle 207.

The contact reaction force Ft is divided into force Fx in the axial direction (X-axis direction) of the injection nozzle 56 and force Fy in the direction (Y-axis direction) perpendicular to the axial direction (X-axis direction). Because the forward force Fn of the injection nozzle 56 is greater than the force Fx in the axial direction, the injection nozzle 56 continues to move forward. Because the force Fy in the vertical direction is greater than the frictional force Fm acting on the hot runner nozzle 207 (e.g., the nozzle component 207c), the hot runner nozzle 207 performs the floating operation in the direction of the force Fy.

When the hot runner nozzle 207 (e.g., the nozzle component 207c) is fastened by the floating plate 203 and the pressure plate 204, the frictional force Fm becomes greater than Fy, and the hot runner nozzle 207 cannot perform the floating operation. In the present embodiment, since a spacing between the floating plate 203 and the pressure plate 204 is greater than a thickness of the protruding portion 237 of the nozzle component 207c, the frictional force Fm only acts due to the compressive force Fs of the spring and becomes smaller than Fy.

FIG. 8 illustrates a state in which the hot runner nozzle 207 comes into a nozzle touch state with the sprue bushing 105. The protrusion 2171 at the leading-edge portion 217 of the hot runner nozzle 207 on the side closest to the mold 100 completely fits into the recess 1161 formed in the mold 100. A height of the protrusion 2171 of the hot runner nozzle 207 is greater than a depth of the recess 1161 in the sprue bushing 105. When the edge surface 2173 and the bottom surface 1162 contact each other, a gap can generate between the reference surface 2170 of the leading-edge portion 217 and the reference surface 1160 of the nozzle touch portion 116. The structure of the present embodiment is such a structure that, when the leading-edge portion 217 of the hot runner nozzle 207 comes into contact (i.e. nozzle touch state) with the sprue bushing 105, a pressing force in the nozzle touch state is exerted from the injection nozzle 56.

An injection molding system 99 according to an exemplary embodiment will be described below with reference to FIGS. 9A, 9B, 9C and 9D. FIGS. 9A, 9B, 9C and 9D are schematic views of the injection molding system 99 in which a molded product is injection-molded using two molds and one injection molding machine 9. The injection molding system 99 includes a carrying apparatus 3A configured to carry a mold 100A in the Y-axis direction and a carrying apparatus 3B configured to carry a mold 100B in the Y-axis direction. The two molds 100A and 100B can be carried into and out of the injection molding machine 9 by individually operating the carrying apparatuses 3A and 3B as appropriate.

Figure 9A:
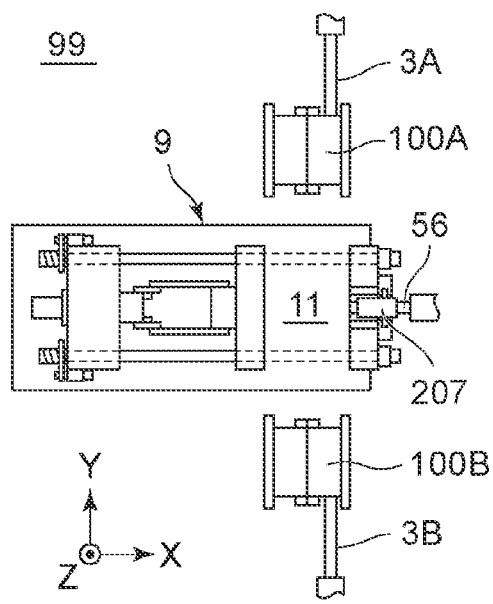
FIGS. 9A, 9B, 9C and 9D are schematic views illustrating an injection molding system.

FIG. 9A illustrates positional relationships among the mold 100A, the mold 100B, the carrying apparatus 3A, the carrying apparatus 3B, and the injection molding machine 9.

Figure 9B:
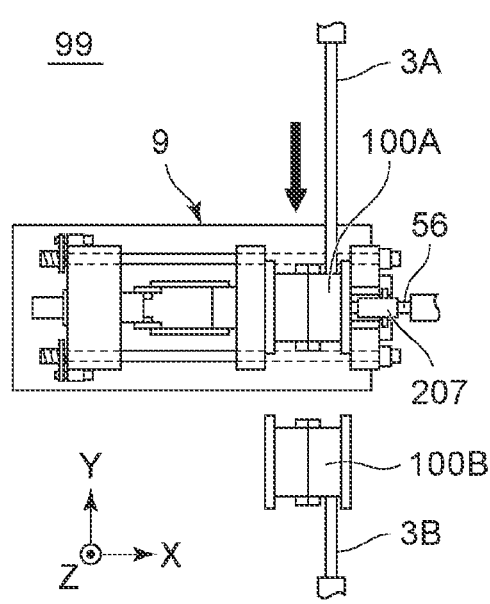

After the mold 100A is carried by the carrying apparatus 3A into an injection molding position 11 in the injection molding machine 9 and the hot runner nozzle 207 is brought into the nozzle touch state with the mold 100A, an injection molding operation is performed. FIG. 9B illustrates a state in which the injection molding operation is performed after completion of successive steps of carrying in the mold 100A into the injection molding position 11 and bringing the mold 100A into the nozzle touch state with the hot runner nozzle 207.

When the injection molding operation up to an injection and pressure-holding step is completed, the hot runner nozzle 207 is moved backward while contact with the injection nozzle 56 is maintained. The mold 100A is carried out of the injection molding position 11 by the carrying apparatus 3A, and the mold 100B is carried into the injection molding position 11 by the carrying apparatus 3B. The hot runner nozzle 207 and the injection nozzle 56 are then moved forward while they are kept in contact with each other.

Figure 9C:
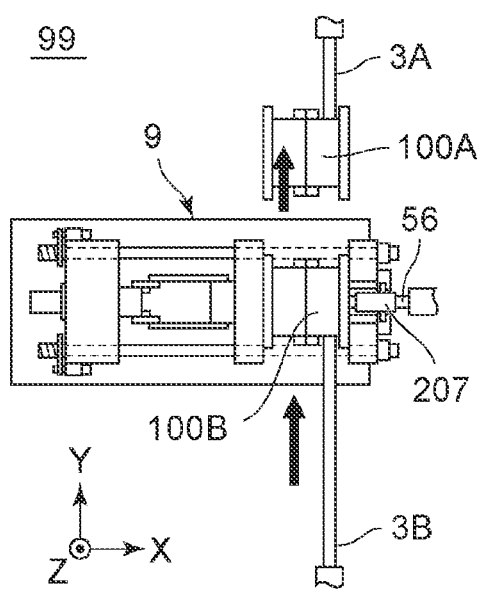

After the hot runner nozzle 207 comes into the nozzle touch state with the mold 100B, the injection molding operation is performed. FIG. 9C illustrates a state in which the injection molding operation is performed after completion of successive steps of carrying out the mold 100A, carrying in the mold 100B into the injection molding position 11, and bringing the mold 100B into the nozzle touch state with the hot runner nozzle 207.

Figure 9D:
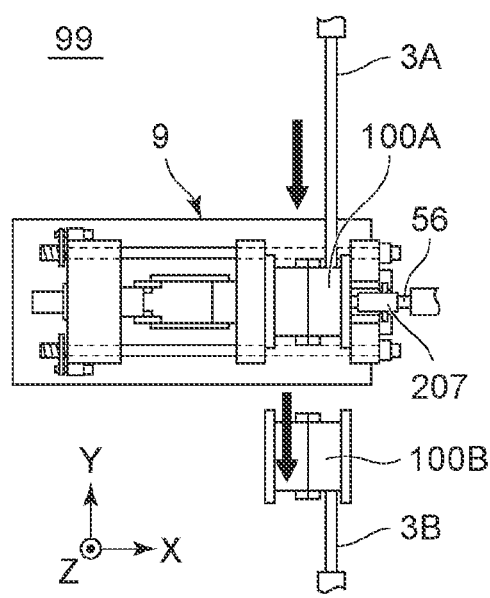

When the injection molding operation up to an injection and pressure-holding step for the mold 100B is completed, the hot runner nozzle 207 is moved backward while contact with the injection nozzle 56 is maintained. The mold 100B is then carried out of the injection molding position 11 by the carrying apparatus 3B. FIG. 9D illustrates a state in which the injection molding operation is performed after completion of successive steps of carrying out the mold 100B, carrying in the mold 100A into the injection molding position 11, and bringing the mold 100A into the nozzle touch state with the hot runner nozzle 207.

Examples of the above-described embodiments will be described below.

A degree of leakage of the resin 2 through a resin inlet through which the resin flows from the hot runner nozzle 207 to the sprue 115 of the mold 100A/100B was evaluated by repeating the molding steps with the injection molding system 99 illustrated in FIGS. 9A to 9D. Molding conditions in various Examples and Comparative Example are listed in Table 1.

TABLE 1

| Resin | polypropylene |
|---|---|
| Molding Temperature | 200° C. |
| Mold Temperature | 40° C. |
| Injection Speed | 50 mm/s |
| Molding Cycle | 40 s |
| Mold Carrying-In/-Out Operation | 10 s |
| Number of Molding Shots | 20 shots |

Example 1

Example 1 will be described with reference to FIGS. 10A, 10B and 10C, which illustrate an example of a nozzle touch state in an injection operation step of Example 1.

Figure 10A:
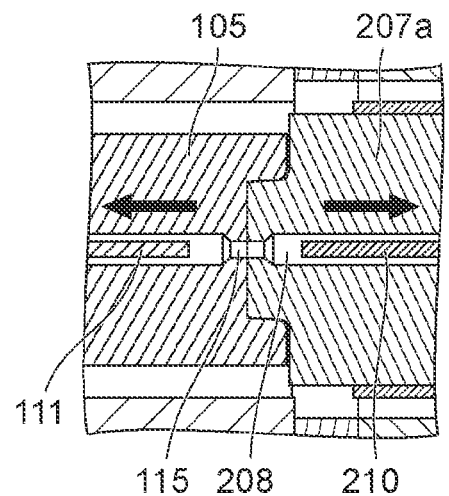
FIGS. 10A, 10B and 10C are schematic views illustrating an example of the present disclosure.

In FIG. 10A, the valve pin 111 for sealing the sprue 115 serving as the resin inlet hole of the sprue bushing 105 in the mold 100A or the mold 100B is moved up to a predetermined limit in a backward movement. The valve pin 210 for sealing the hot runner 208 of the hot runner nozzle 207 is moved up to a predetermined limit in a backward movement. This connects the sprue 115 and the hot runner 208 with each other. The operation of injecting the resin 2 into the mold 100A/100B is performed in a state in which the valve pin 210 and the valve pin 111 are apart from each other.

Figure 10B:
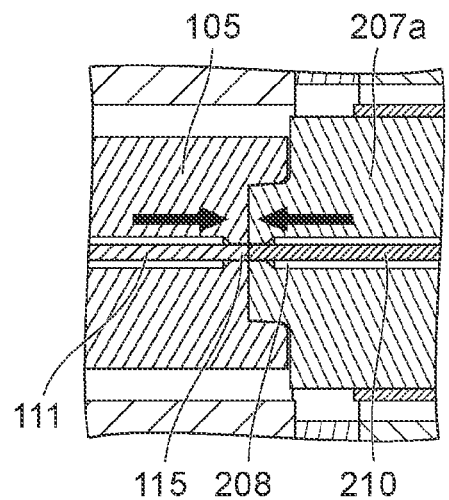
Figure 10C:
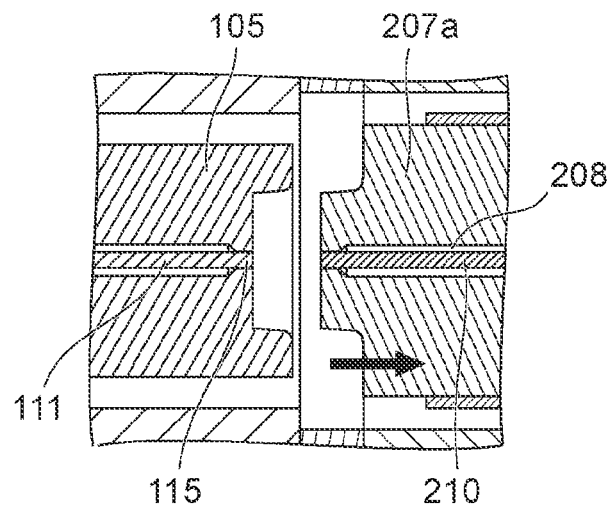

Subsequent to the state of FIG. 10A, in FIG. 10B, upon completion of a securing pressure, the valve pin 111 is moved forward to a position at which the sprue 115 is closed, and the valve pin 210 is moved forward to a position at which the hot runner 208 is sealed. Thus, the valve pin 210 and the valve pin 111 are brought into a state where they contact each other.

Subsequent to the state of FIG. 10B, in FIG. 10C, the hot runner nozzle 207 is moved backward while contact with the injection nozzle 56 remains as described with reference to FIG. 8. The distance between the hot runner nozzle 207 and the mold 100A/100B is increased with the movement of the hot runner nozzle 207 in the X-axis direction.

The leakage of the resin through the resin inlet through which the resin flows from the hot runner nozzle 207 to the sprue 115 of the mold 100A/100B did not occur after 20 shots of the molding with mold 100A or mold 100B. The floating operation described with reference to FIG. 6 was performed at the time of the hot runner nozzle 207 coming into the nozzle touch state with the sprue bushing 105. In the space between the floating plate 203 and the pressure plate 204, no wear tracks were found in the protruding portion 237 of the hot runner nozzle 207.

Example 2

Figure 11:
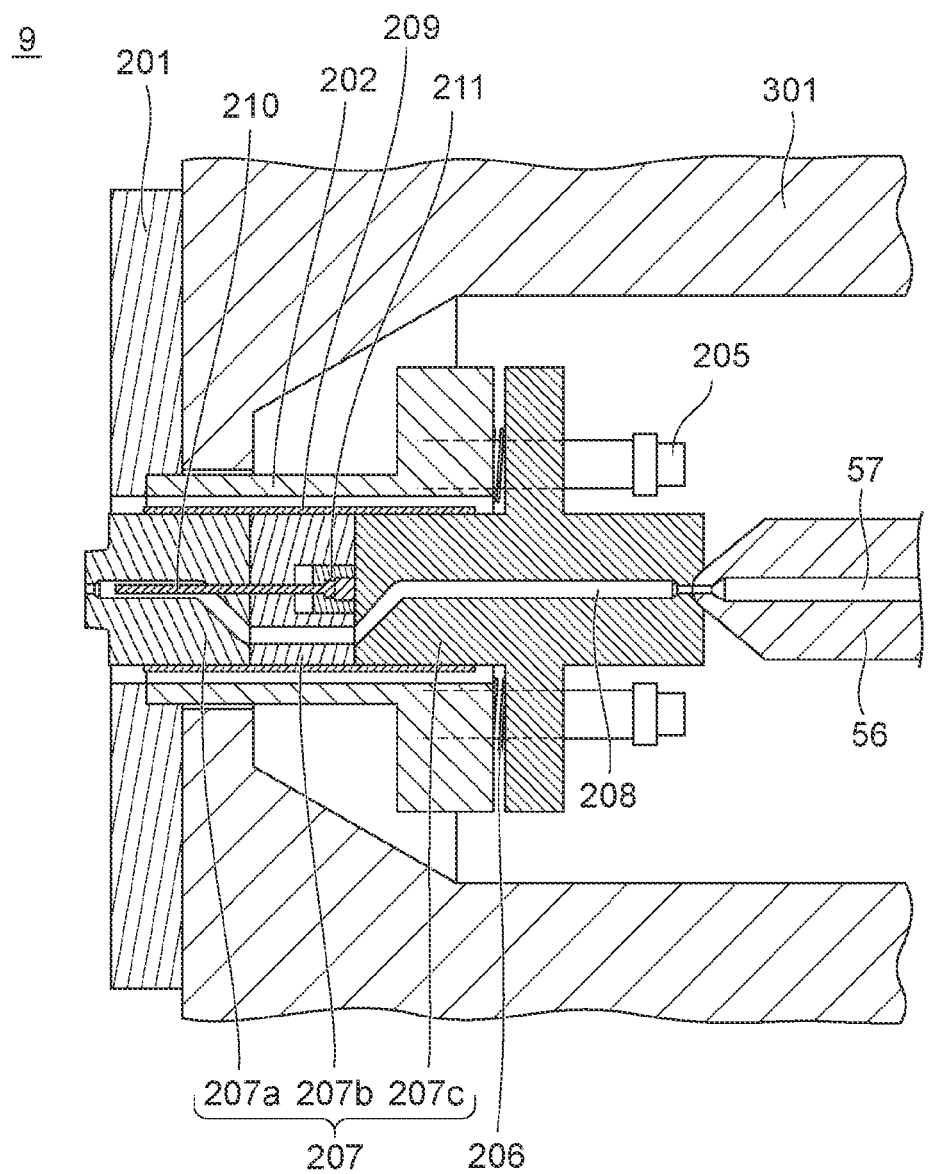
FIG. 11 is a schematic view illustrating an example of the present disclosure.

Example 2 will be described with reference to an injection molding machine 9 illustrated in FIG. 11. In injection molding machine 9, the hot runner nozzle 207 is joined to the fixed flange 202 with the spring component 206 interposed therebetween. In the injection molding machine 9 of Example 2, does not include the floating plate 203 and the pressure plate 204 and the nozzle component 207c of the hot runner nozzle 207 is directly fitted to the guide pin 205. The hot runner nozzle 207 can be displaced in the Y-axis direction with a gap formed between the nozzle component 207c and the guide pin 205. If no gap is formed between the nozzle component 207c and the guide pin 205, the floating operation is difficult to realize because the guide pin 205 restricts the hot runner nozzle 207 from displacing in the Y-axis direction.

The leakage of the resin through the resin inlet through which the resin flows from the hot runner nozzle 207 to the sprue 115 of the mold 100A/100B did not occur after 20 shots of the molding with mold 100A or mold 100B.

Because control of the displacement of the hot runner nozzle 207 (e.g., the nozzle component 207c) in the Y-axis direction was insufficient, wear tracks generated in the side surface 2172 of the leading-edge portion 217 of the hot runner nozzle 207 as well as in sliding portions of the nozzle component 207c and the guide pin 205.

Comparative Example

Figure 12:
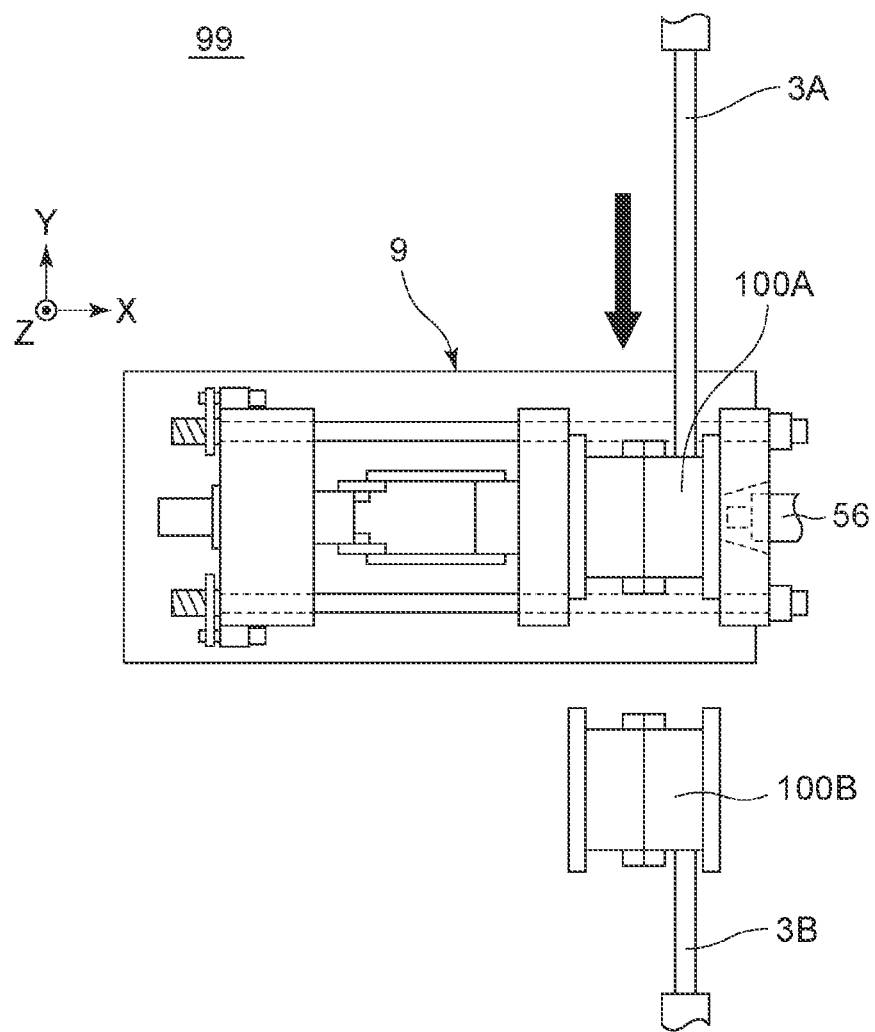
FIG. 12 is a schematic view illustrating a Comparative Example.

FIG. 12 illustrates a Comparative Example in which a molded product is injection-molded using two molds similar to those used in the above-described embodiment and one injection molding machine. The Comparative Example is different from Examples 1 and 2 in that the hot runner nozzle 207 is not used and the injection nozzle 56 directly comes into a nozzle touch state with both mold 100A and mold 100B.

Figure 13A:
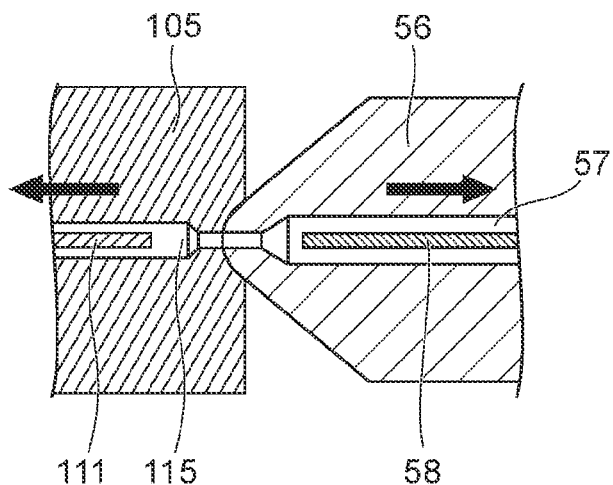
FIGS. 13A, 13B and 13C are schematic views illustrating a Comparative Example.
Figure 13B:
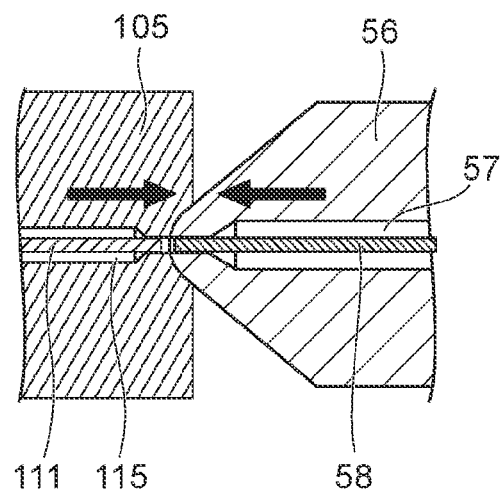
Figure 13C:
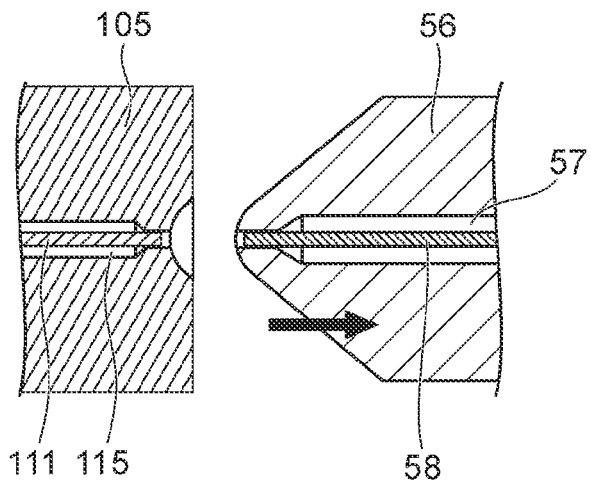

FIGS. 13A, 13B and 13C illustrate a nozzle touch state in an injection operation step in Comparative Example.

In FIG. 13A, the valve pin 111 for sealing the sprue 115 serving as the resin inlet hole of the sprue bushing 105 in the mold 100A or the mold 100B and a valve pin 58 for sealing the resin flow path 57 in the injection nozzle 56 are both moved up to a predetermined limit in the backward movement. Then, the injection operation is performed in a state in which the sprue 115 and the resin flow path 57 are connected so that the resin can flow through these components.

In FIG. 13B, upon completion of a securing pressure, the valve pin 111 is moved forward to a position at which the sprue 115 is sealed, and the valve pin 58 is moved forward to a position at which the resin flow path 57 is sealed.

In FIG. 13C, the injection nozzle 56 is moved backward.

The leakage of the resin 2 through the resin inlet through which the resin flows from the hot runner nozzle 207 to the sprue 115 of the mold 100A/100B occurred after 20 shots of the molding with both mold 100A and mold 100B. An amount of the leaked resin was approximately 1 g.

Since the injection nozzle 56 and the sprue bushing 105 had curved shapes and were in line contact with each other, neither galling nor wear occurred with the nozzle touch operation.

Results

In the Comparative Example, the wear due to the nozzle touch operation did not occur. Because of the line contact in the nozzle touch portion 116, sealing of the resin was insufficient and the leakage of the resin occurred. If the amount of the leaked resin is approximately 1 g per 20 shots, it reaches an amount of the resin corresponding to one molded product after approximately 1000 shots. Accordingly, maintenance work of the mold is required to remove the leaked resin each time the amount of the leaked resin reaches a certain value.

In Example 2, because the leading-edge portion 217 and the nozzle touch portion 116 were in plane contact with each other, the resin sealing state was good, and the leakage of the resin did not occur. The wear due to the nozzle touch operation occurred with the movements of the sprue bushing 105 and the hot runner nozzle 207 attributable to the plane contact.

In Example 1, because the leading-edge portion 217 and the nozzle touch portion 116 were in plane contact with each other and were able to perform the floating operation, it was possible to suppress both the leakage of the resin and the wear due to the nozzle touch operation.

Implementing the present disclosure is not limited to the above-described embodiments and various modifications that enable practice of the present disclosure are applicable. Forms in implementing the present disclosure is not limited to the above-described embodiment and can be variously modified within the technical concept of the present disclosure.

For example, in the above-described embodiment(s), the floating operation is realized with the gap formed between the hot runner nozzle 207 and the holder 200. In another exemplary embodiment, the hot runner nozzle 207 can be secured by a member including a spherical or cylindrical component, such as a ball retainer, or by a member supported through a spring component, such as a coil spring, a plate spring, or a conical spring.

The shape of the hot runner nozzle 207 is not limited to that illustrated in FIG. 3B. In another exemplary embodiment, the hot runner nozzle 207 can be directly attached to the injection nozzle 56. The leading-edge portion 217 of the hot runner nozzle 207 and the mold 100 can partially contact each other, where the contact between them can be partial plane contact or a combination of the line contact and the plane contact.

The above-described embodiments can be modified as appropriate within the range not departing from the technical concept of the present disclosure. For example, the embodiments can be combined with each other. Not all aspects of the respective embodiments need be implemented and a part of matters disclosed in at least one of the embodiments can be omitted or replaced. Moreover, a new matter can be added to at least one of the embodiments.

The contents disclosed in this Specification include not only the matters explicitly stated in this Specification, but also all other matters that can be grasped from this Specification and the drawings attached to this Specification. The contents disclosed in this Specification further include complements of individual concepts stated in this Specification. In more detail, for example, when this Specification includes the expression "A is B", it can be said that this Specification discloses the case of "A being not B" even if the expression "A is not B" is omitted. This is because the case including the expression "A is B" is premised on that the case of "A being not B" is also taken into consideration.

The present disclosure provides a technique advantageous in performing injection molding in a satisfactory fashion.

While exemplary embodiments have been described, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2021-090315 filed May 28, 2021, which is hereby incorporated by reference herein in its entirety.

What is claimed is:

1. An injection molding machine comprising:
a first nozzle; and
a second nozzle;
wherein resin is injected into a mold from the first nozzle through the second nozzle,
wherein a distance between the second nozzle and the mold is changed with movement of at least the second nozzle in a first direction, and
wherein the second nozzle is displaceable in a second direction intersecting the first direction in a state in which the mold is fixedly secured relative to the first nozzle and the second nozzle is in contact with the first nozzle.

2. The injection molding machine according to claim 1, wherein the second nozzle includes a heater arranged to heat the resin in a resin flow path in the second nozzle.

3. The injection molding machine according to claim 2, wherein the second nozzle includes a valve pin arranged to open and close the resin flow path in the second nozzle.

4. The injection molding machine according to claim 1, wherein the first nozzle does not include a valve pin arranged to open and close a resin flow path in the first nozzle.

5. The injection molding machine according to claim 1, wherein an end portion of the second nozzle on a side closer to the mold is fitted to a recess formed in the mold.

6. The injection molding machine according to claim 5, wherein the first end portion has an inclined surface that is inclined relative to the first direction, and wherein a side surface of the recess in the mold is an inclined surface that is inclined relative to the first direction.

7. The injection molding machine according to claim 5, wherein the first end portion has a flat surface along the second direction, and a bottom surface of the recess in the mold is a flat surface along the second direction.

8. The injection molding machine according to claim 1, wherein an end portion of the second nozzle on a side closer to the first nozzle includes a recess in contact with the first nozzle.

9. The injection molding machine according to claim 8, wherein the recess in the end portion has a curved surface.

10. The injection molding machine according to claim 5, wherein the second nozzle includes a valve pin arranged to open and close a resin flow path in the end portion.

11. The injection molding machine according to claim 1, further comprising a holder arranged to secure the second nozzle, wherein the second nozzle includes a protruding portion arranged to protrude in the second direction, wherein the holder includes a first portion and a second portion that are arranged side by side in the first direction, the protruding portion positioned between the first portion and the second portion in the first direction, and wherein when the second nozzle is displaced, the protruding portion is moved in the second direction between the first portion and the second portion.

12. The injection molding machine according to claim 11, wherein the holder includes a third portion arranged to face the protruding portion with a gap formed therebetween in the second direction, and wherein a size of the gap between the protruding portion and the third portion is changed when the second nozzle is displaced.

13. The injection molding machine according to claim 12, wherein the first portion and the third portion belong to a first component of the injection molding machine, and wherein the second portion belongs to a second component of the injection molding machine different from the first component.

14. The injection molding machine according to claim 13, wherein the holder includes a third component of the injection molding machine fixedly secured relative to the first nozzle and a spring component, and wherein the first component is connected to the third component with the spring component interposed therebetween.

15. The injection molding machine according to claim 14, wherein the holder includes a fixing component penetrating through the second component and the first component and fitted to the third component.

16. The injection molding machine according to claim 11, further comprising a fixed member arranged to fixedly secure the first nozzle, wherein the holder is fixed to the fixed member.

17. The injection molding machine according to claim 16, further comprising an abutment member arranged to abut the mold, wherein the abutment member is fixed to the fixed member, wherein the abutment member forms an opening, and wherein the second nozzle is moved through the opening in the first direction.

18. An injection molding system comprising:
an injection molding machine comprising:
a first nozzle, and
a second nozzle, wherein resin is injected into a mold from the first nozzle through the second nozzle, wherein a distance between the second nozzle and the mold is changed with movement of at least the second nozzle in a first direction, and wherein the second nozzle is displaceable in a second direction intersecting the first direction in a state in which the mold is fixedly secured relative to the first nozzle and the second nozzle is in contact with the first nozzle;

a first carrying apparatus configured to, on condition of the mold being a first mold, carry the first mold in the second direction; and a second carrying apparatus configured to carry a second mold different from the first mold in the second direction.

19. A method of manufacturing a resin molded product by injecting resin into a mold from a first nozzle through a second nozzle, the method comprising:

changing a distance between the second nozzle and the mold by moving at least the second nozzle in a first direction, and displacing the second nozzle in a second direction intersecting the first direction in a state in which the mold is fixedly secured relative to the first nozzle and the second nozzle is in contact with the first nozzle.

20. The manufacturing method according to claim 19, further comprising heating the resin in a resin flow path in the mold.

21. The manufacturing method according to claim 19, further comprising:

opening and closing a resin flow path in the second nozzle by a first valve pin of the second nozzle;

opening and closing a resin flow path in the mold by a second valve pin of the mold;

injecting the resin into the mold in a first state in which the first valve pin and the second valve pin are apart from each other;

establishing, subsequent to the first state, a second state in which the first valve pin and the second valve pin are in contact with each other; and increasing, subsequent to the second state, the distance between the second nozzle and the mold by moving the second nozzle in the first direction.

* * * * *